(12) United States Patent
Wanser et al.

(10) Patent No.: US 10,404,555 B2
(45) Date of Patent: *Sep. 3, 2019

(54) SYSTEM AND METHOD FOR DYNAMIC MANAGEMENT OF NETWORK DEVICE DATA

(71) Applicant: Fortinet, Inc., Sunnyvale, CA (US)

(72) Inventors: Kelly Wanser, Thornton, CO (US); Andreas Markos Antonopoulos, San Francisco, CA (US)

(73) Assignee: Fortinet, Inc., Sunnyvale, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/601,920

(22) Filed: May 22, 2017

(65) Prior Publication Data

US 2017/0264509 A1 Sep. 14, 2017

Related U.S. Application Data

(63) Continuation of application No. 13/778,042, filed on Feb. 26, 2013, now Pat. No. 9,729,409, which is a continuation of application No. 13/645,007, filed on Oct. 4, 2012.

(51) Int. Cl.
*H04L 12/24* (2006.01)
*H04L 12/26* (2006.01)

(52) U.S. Cl.
CPC ............ *H04L 43/04* (2013.01); *H04L 41/085* (2013.01); *H04L 41/0816* (2013.01);
(Continued)

(58) Field of Classification Search
CPC ..... H04L 41/046; H04L 41/085; H04L 12/26; H04L 41/0654; H04L 41/0866
See application file for complete search history.

(56) References Cited

U.S. PATENT DOCUMENTS 5,049,873 A * 9/1991 Robins .................... H04L 45/02
340/2.1
5,745,693 A * 4/1998 Knight .................... H04L 41/06
709/224

(Continued)

FOREIGN PATENT DOCUMENTS

WO 2014055793 4/2014

OTHER PUBLICATIONS

PCT International Search Report and Written Opinion for PCT International Appln No. PCT/US2013/063318 dated Jan. 22, 2013, 14 pgs.

(Continued)

*Primary Examiner* — Backhean Tiv
(74) *Attorney, Agent, or Firm* — Jaffery Watson Hamilton & Mendonsa, LLP

(57) ABSTRACT

A method and apparatus of a device that dynamically changes how management data is managed in response to events detected in a network system is described. In an exemplary embodiment, the device detects an event occurring in the network system. The device further determines if the event triggers a system change in how the management data is reported on one or more of the managed nodes. If the event notification does trigger the system change, for each of the one or more of the managed nodes, the device determines a command for that manage node that represents a specific change in how frequent the management data is reported to the network management system. In addition, the device sends the command to that managed node, where the agent applies the command to the managed node and the applied command implements the specific change in how frequent the management data is reported to the network management system.

20 Claims, 15 Drawing Sheets

(52) U.S. Cl.
CPC ......... *H04L 43/103* (2013.01); *H04L 41/046* (2013.01); *H04L 43/0811* (2013.01)

(56) References Cited

U.S. PATENT DOCUMENTS

| | | | | |
|---|---|---|---|---|
| 5,999,179 | A * | 12/1999 | Kekic | H04L 41/0213 715/734 |
| 6,272,537 | B1 * | 8/2001 | Kekic | G06F 8/34 709/203 |
| 6,405,250 | B1 * | 6/2002 | Lin | H04L 41/046 700/29 |
| 6,484,261 | B1 * | 11/2002 | Wiegel | H04L 41/0856 715/763 |
| 6,718,535 | B1 | 4/2004 | Underwood | |
| 6,788,315 | B1 * | 9/2004 | Kekic | H04L 41/0681 709/203 |
| 6,889,169 | B2 * | 5/2005 | Kirshenbaum | H04L 43/022 702/187 |
| 6,983,321 | B2 * | 1/2006 | Trinon | G06Q 10/06 709/224 |
| 6,996,624 | B1 * | 2/2006 | LeCroy | H04L 29/06027 370/231 |
| 7,181,529 | B2 | 2/2007 | Bhatia et al. | |
| 7,213,068 | B1 | 5/2007 | Kohli et al. | |
| 7,353,269 | B2 | 4/2008 | Kawasaki et al. | |
| 7,526,541 | B2 | 4/2009 | Roese et al. | |
| 7,552,211 | B2 * | 6/2009 | Hansen | H04L 41/0609 709/203 |
| 7,782,786 | B1 * | 8/2010 | Natarajan | H04L 41/06 370/244 |
| 7,970,879 | B1 * | 6/2011 | Liang | H04L 41/0213 709/223 |
| 7,990,943 | B2 * | 8/2011 | Petersen | H04W 4/20 370/349 |
| 8,086,721 | B2 * | 12/2011 | See | H04L 41/024 709/224 |
| 8,213,340 | B1 * | 7/2012 | Glicklich | H04L 41/12 370/258 |
| 8,478,872 | B2 | 7/2013 | Krywaniuk | |
| 8,640,198 | B2 | 1/2014 | Raleigh | |
| 9,077,611 | B2 * | 7/2015 | Cordray | H04L 41/0213 |
| 9,729,409 | B2 * | 8/2017 | Wanser | H04L 43/04 |
| 2001/0023445 | A1 * | 9/2001 | Sundqvist | H04L 12/6418 709/228 |
| 2001/0023453 | A1 * | 9/2001 | Sundqvist | H04L 47/10 709/232 |
| 2002/0038386 | A1 * | 3/2002 | Bhatia | H04L 67/16 709/250 |
| 2002/0083169 | A1 * | 6/2002 | Aki | H04L 41/5009 709/224 |
| 2003/0033521 | A1 * | 2/2003 | Sahlbach | H04L 9/3263 713/156 |
| 2003/0041138 | A1 * | 2/2003 | Kampe | H04L 41/0893 709/223 |
| 2003/0084150 | A1 * | 5/2003 | Hansen | H04L 41/0609 709/224 |
| 2004/0008727 | A1 | 1/2004 | See et al. | |
| 2004/0153287 | A1 | 8/2004 | Kirshenbaum et al. | |
| 2005/0027837 | A1 * | 2/2005 | Roese | H04L 41/0893 709/223 |
| 2005/0119996 | A1 * | 6/2005 | Ohata | G06F 11/3495 |
| 2006/0037075 | A1 | 2/2006 | Frattura et al. | |
| 2006/0212556 | A1 * | 9/2006 | Yacoby | H04L 41/0893 709/223 |
| 2006/0277299 | A1 | 12/2006 | Baekelmans et al. | |
| 2007/0047466 | A1 | 3/2007 | Todokoro | |
| 2007/0064736 | A1 | 3/2007 | Miriyala et al. | |
| 2007/0274224 | A1 * | 11/2007 | Suzuki | H04L 41/08 370/248 |
| 2008/0104196 | A1 * | 5/2008 | Yalakanti | H04L 41/046 709/217 |
| 2008/0159290 | A1 * | 7/2008 | Sultan | H04L 12/4641 370/392 |
| 2008/0198787 | A1 * | 8/2008 | Nguyen | H04L 1/0084 370/315 |
| 2008/0317006 | A1 * | 12/2008 | Li | H04L 41/00 370/352 |
| 2009/0077211 | A1 * | 3/2009 | Appleton | H04L 41/069 709/223 |
| 2009/0204697 | A1 * | 8/2009 | Jaladanki | E04H 17/1417 709/223 |
| 2009/0204702 | A1 | 8/2009 | Jensen et al. | |
| 2010/0071024 | A1 | 3/2010 | Eyada | |
| 2010/0146582 | A1 * | 6/2010 | Jaber | G06F 21/6218 726/1 |
| 2010/0162051 | A1 * | 6/2010 | Yoon | H04L 12/00 714/47.1 |
| 2010/0195537 | A1 * | 8/2010 | Pelletier | H04L 41/0604 370/255 |
| 2010/0251244 | A1 | 9/2010 | Fukui | |
| 2010/0325257 | A1 * | 12/2010 | Goel | H04L 29/12028 709/223 |
| 2011/0110291 | A1 * | 5/2011 | Ishii | H04B 7/155 370/315 |
| 2011/0228685 | A1 * | 9/2011 | Higashi | H04L 47/10 370/252 |
| 2012/0207137 | A1 * | 8/2012 | Zhou | H04L 41/12 370/331 |
| 2013/0013777 | A1 | 1/2013 | Krywaniuk | |
| 2013/0067047 | A1 | 3/2013 | Wikstrom | |
| 2013/0103836 | A1 * | 4/2013 | Baniqued | H04L 41/0803 709/226 |
| 2013/0132854 | A1 * | 5/2013 | Raleigh | G06F 3/0482 715/738 |
| 2013/0204450 | A1 | 8/2013 | Kagan et al. | |
| 2013/0297768 | A1 | 11/2013 | Singh | |
| 2013/0336104 | A1 * | 12/2013 | Talla | H04L 45/245 370/216 |
| 2014/0101301 | A1 * | 4/2014 | Wanser | H04L 43/04 709/224 |
| 2014/0101308 | A1 * | 4/2014 | Wanser | H04L 43/04 709/224 |
| 2014/0161131 | A1 | 6/2014 | Yang et al. | |
| 2014/0337497 | A1 | 11/2014 | Wanser et al. | |
| 2017/0264509 | A1 * | 9/2017 | Wanser | H04L 43/04 |

OTHER PUBLICATIONS

PCT Chapter I International Preliminary Report on Patentability for PCT International Appln No. PCT/US2013/063318 dated Apr. 16, 2015, 11 pgs.
EP 13 84 3127, Supplementary European Search Report, dated Oct. 9, 2015, 2 pgs.
Cho, H. J. et al. "QoS-Aware Date Reporting Control in Cluster-Based Wireless Sensor Networks." Computer Communications, Elsevier Science Publishers BV, Amsterdam, NL. vol. 22, No. 11, Jul. 31, 2010, pp. 1244-1254. XP027061413, ISSN:0140-3664.
Non-Final Rejection for U.S. Appl. No. 13/645,007 dated Aug. 4, 2015.
Final Rejection for U.S. Appl. No. 13/645,007 dated Apr. 18, 2014.
Non-Final Rejection for U.S. Appl. No. 13/645,007 dated Jul. 18, 2013.
Notice of Allowance for U.S. Appl. No. 13/778,042 dated Apr. 10, 2017.
Final Rejection for U.S. Appl. No. 13/778,042 dated Mar. 14, 2016.
Non-Final Rejection for U.S. Appl. No. 13/778,042 dated Aug. 3, 2015.
Non-Final Rejection for U.S. Appl. No. 13/778,042 dated Jan. 9, 2014.
Non-Final Rejection for U.S. Appl. No. 13/778,042 dated Jul. 16, 2013.
Final Rejection for U.S. Appl. No. 13/645,007 dated Jul. 11, 2018.

* cited by examiner

SYSTEM AND METHOD FOR DYNAMIC MANAGEMENT OF NETWORK DEVICE DATA

CROSS-REFERENCE TO RELATED APPLICATIONS

The application is a continuation of U.S. patent application Ser. No. 13/778,042, filed Feb. 26, 2013, which is a continuation of U.S. patent application Ser. No. 13/645,007, filed Oct. 4, 2012, both of which are hereby incorporated by reference in their entirety for all purposes.

BACKGROUND

Field

Embodiments of the present invention relates generally to data networking and more particularly to dynamically managing management data of network devices.

Description of the Related Art

A network management system (NMS) is a system used to monitor and administer a network of devices. A network of devices is collection of devices that are interconnected by a data network that allows for the sharing of resources and information. Each of these devices can be a physical or virtual device. In addition, each of these devices may have one or more different services running on that device, where the service is accessible over this network. Furthermore, each of the devices that are visible to the NMS is called a managed node.

The NMS manages these managed nodes of the network by receiving management data about the managed nodes and/or providing configuration settings or other administrative commands to the node. For example, the NMS can receive management data regarding the managed nodes such as faults, configuration, accounting, performance, and security information. What type of information each managed node collects, the type of information the NMS receives and how frequently the NMS receives this information depends on how each managed node is configured. For example, a network administrator may manually configure each of the managed nodes on the type of information collected, the type transmitted to the NMS, and frequency of the information transmission. The network administrator configures using a network management user interface that can send configuration commands to the managed node using a networking protocol (e.g., Simple Network Management Protocol (SNMP) or command line interface (CLI)). This configuration is static because the managed node configuration does not change unless the system administrator manually changes the configuration.

One problem with a manual configuration is that by manually configuring the management data configuration, the type of information collected, transmitted, and frequency of transmission cannot automatically respond to events in the network.

SUMMARY

A method and apparatus of a device that dynamically changes how management data is managed in response to events detected in a network system is described. In an exemplary embodiment, the device receives an event notification from an agent associated with a managed node. The device further determines if the received event notification triggers a change in how the management data is managed on that managed node. If the event notification does trigger a change, the device determines a command for that manage node that represents that change in how the management data is managed on the managed node. In addition, the device sends the command to the agent residing on the managed node, where the agent applies the command to the managed node and the applied command implements the change in how the management data is managed on the managed node.

In a further embodiment, the device detects an event occurring in the network system. The device determines if this event triggers a system change in how the management data is managed on one or more of the plurality of managed nodes. If the event does trigger a system change, the device, for each of the one or more of the plurality of the managed node, determines a command for that managed node that represents a specific change in how the management data is managed on that managed node, and sends the command to an agent associated with that managed node. The agent applies the command to that managed node and the applied command implements the specific change in how the management data is managed on that managed node.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
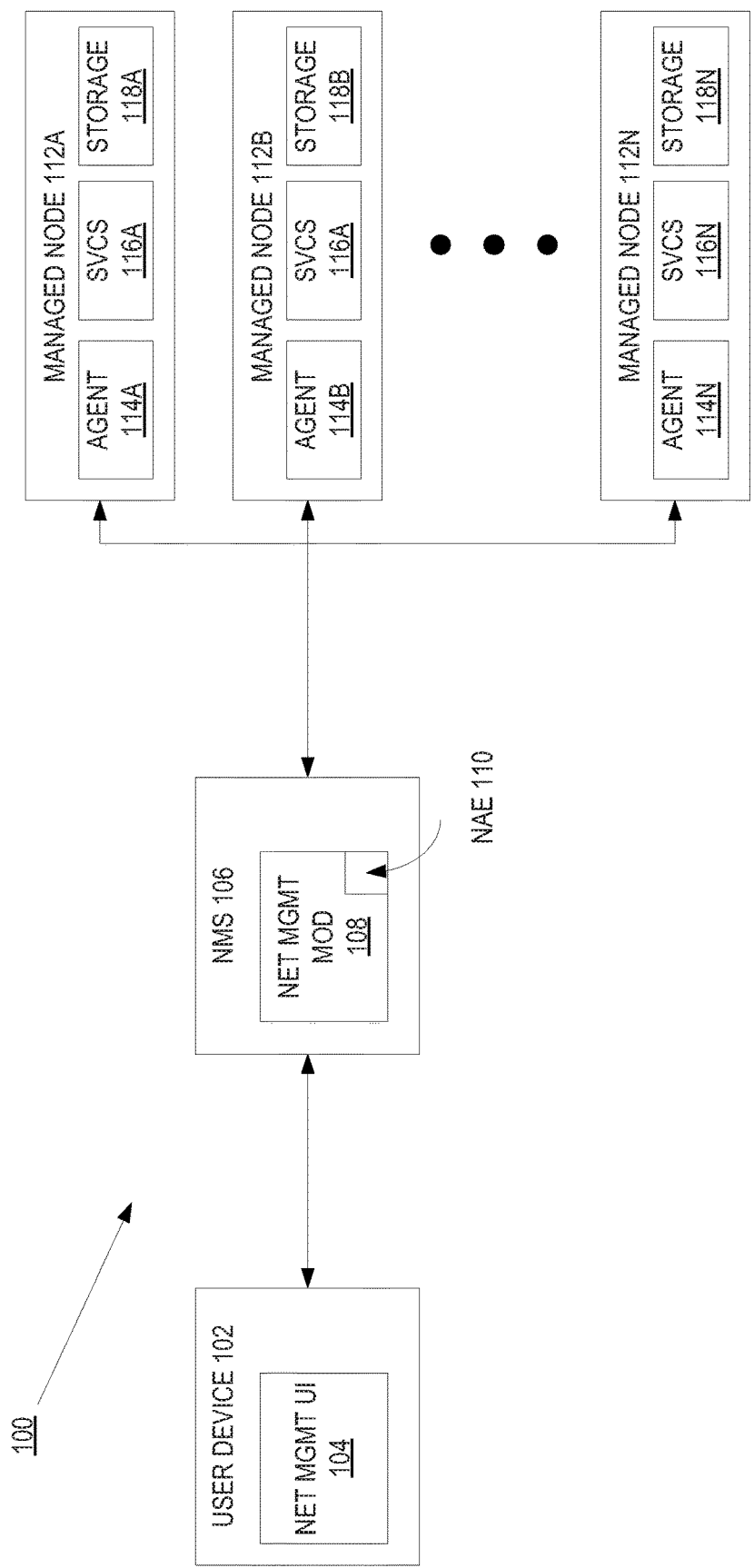
FIG. 1 is a block diagram of a system that communicates management data between managed nodes and a network management system in accordance with an embodiment of the present invention.

A method and apparatus of a device that dynamically changes how management data is managed in response to events detected in a network system is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that dynamically changes how management data is managed in response to events detected in a network system is described. In one embodiment, the device detects an event in the system. In this embodiment, the detected event can be an event notification that is received from one of the managed nodes, an event detected by an agent associated with the managed node, an event detected from a system analysis, or a user interface event. The device determines if this event triggers a change in how the management data of a managed node is managed (e.g., how the management data is collected and reported). If the event does trigger a change, the device determines what the changes are for that managed node. The device creates a command for that managed node that corresponds to the determined change and sends the command to that managed node.

FIG. 1 is a block diagram of one embodiment of a system 100 that communicates management data between managed nodes 112A-N and a network management system (NMS) 106. In FIG. 1, the system 100 includes an NMS 106 that is used to monitor and administer a number of managed nodes 112A-N. In one embodiment, a system administrator interacts with the NMS 106 through a network management user interface 104 that is running on a device 102. In one embodiment, management data for a managed node is information that characterizes a functioning state about a managed node, such as state information, environmental information, and/or information about data being processed and flowing within the managed node. For example and in one embodiment, management data is faults, configuration, accounting, performance, and/or security information. In another embodiment, management data is processing statistics, status information, and/or data processed.

In one embodiment, the NMS 106 includes a network management module 108 that monitors and administers the plurality of managed nodes 112A-N. In one embodiment, the network management module 108 receives management data from the managed nodes 112A-N and sends commands to the managed nodes 112A-N. In one embodiment, these commands are used to change how the management data of the managed nodes is managed. In one embodiment, management of the management data can include type and frequency of management data collected, the frequency in which the management data is reported, which management data is reported, the size of the window used to collect the management data, which device is to receive the management data, encryption and/or compression for the collection and/or reporting of the management data, whether to save data for forensic analysis, and/or logging of system information. In addition, the management of some of the management data can be different from other management data. For example and in one embodiment, port status data may be reported frequently, whereas detailed port throughput statistics (e.g., packets received, transmitted, dropped, etc.) maybe reported less frequently.

In addition, the network management module 108 includes a network automation engine 110, where the network automation engine (NAE) 110 dynamically changes how management data managed by the managed nodes 112A-N in response to events detected in the system 100. For example and in one embodiment, the network automation engine 110 changes the configuration of how management data for a given managed node 112A-N is collected and reported to the NMS 106 in response to a detected event. In one embodiment, the detected event can be one of the managed nodes 112A-N sending an event to the NMS 106, the NMS 106 detecting an event in a network database, an agent 114A-N detecting an event on a corresponding managed node 112A-N, and/or the NMS 106 has detected a user interface event associated with the user interface 104. Changing how management data is managed is further described in FIGS. 3-9 below.

In one embodiment, each of the managed nodes 112A-N is a device in the system 100 that is visible to the NMS 106. In one embodiment, a managed node can be a network element, a personal computer, mobile device, etc., or any other type of device that can communicate data over a network. In one embodiment, a network element can be a network access element (e.g., switch, router, hub, bridge, gateway, etc., or any type of device that can allow access to a network), a network security device (e.g., firewall, intrusion detection/prevention system, etc.), or another type of device that processes networked data. In one embodiment, the managed node 112A-N can be a physical or virtual device. In one embodiment, the managed nodes 112A-N are communicatively coupled to each other, the NMS 106, and the device 102 through a network. In one embodiment, each of the managed nodes 112A-N includes an agent 114A-N, one or more services 116A-N, and storage 118A-N. In this embodiment, the agent 114A-N is a module that runs on the corresponding managed node 114A-N and provides an interface to manage that managed node 114A-N and/or the one or more services 116A-N. For example and in one embodiment, a service for the managed node can be a physical component of the managed node (port, link, etc.), or a networked service (switching, routing, security, administrative, computing service, storage, etc.). In one embodiment, the agent 114A-N receives commands from the NMS to configure the managed node 112A-N and transmits management data to the NMS 106 based on the configuration of the managed node 112A-N.

In another embodiment, agent 114A-N runs on a device coupled to the corresponding managed node 112A-N. In this embodiment, the agent 114A-N proxies management data and commands between the NMS 106 and the corresponding managed node 112A-N. The agent 114A-N proxying management data and commands is further described in FIG. 2 below.

In one embodiment, the services 116A-N running the managed nodes 112A-N are processes that provide a functionality to other devices in the network that are communicatively coupled to the managed node 112A-N hosting the service 116A-N. For example and in one embodiment, a service 116A-N can be a communication service (e.g., switching, routing, packet forwarding, traffic shaping, applying quality of service (QoS), remote access, etc.), security service (e.g., firewall, intrusion detection/prevention, malware protection, content filtering, virtual private networking, physical access control, etc.), cloud services (software-as-a-service (SaaS), infrastructure-as-a-service (IaaS), etc.), virtualized services (machines, networking, storage, etc.), business services (e.g., web service, trading service, etc.), and infrastructure services (e.g., environmental control service, power management and monitoring service, etc.). In one embodiment, the network management module 108 can manage these services 116A-N via agent 114A-N associated with that service 116A-N. In one embodiment, the storage 118A-N stores the management data.

Figure 2:
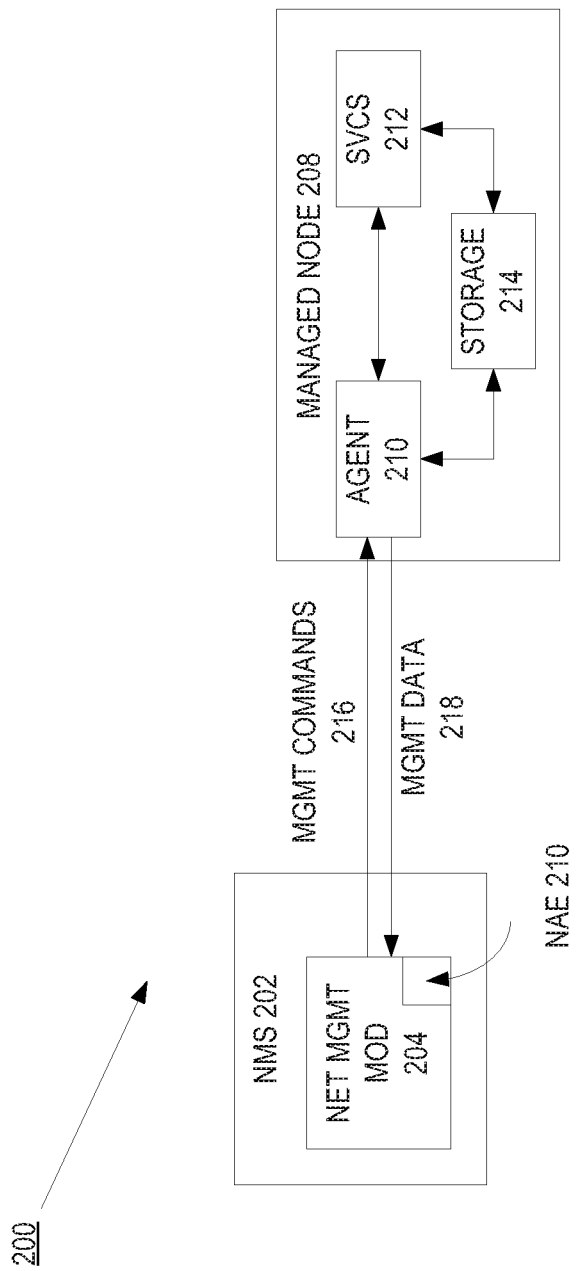
FIG. 2 is a block diagram of a system that communicates management commands and data between a managed node and a network management system in accordance with an embodiment of the present invention.

As described above, the NMS 106 includes the NAE 110 that dynamically changes how management data managed by the managed nodes 112A-N in response to events detected in the system 100. In one embodiment, the NMS 106 detects these events and the NAE 110 transmits commands to the affected managed node 112A-N to change how that managed node 112A-N manages the management data. FIG. 2 is a block diagram of one embodiment of a system 200 that communicates management commands 216 and data 218 between a managed node 208 and a NMS 202. In FIG. 2, NMS 202 includes a network management module 204. In one embodiment, the network management module 204 is a module that monitors and administers the managed node 208. For example and in one embodiment, the network management module 204 receives management data 218 from the managed node 208 and transmits commands 216 to the managed node 208. In one embodiment, the network management module 204 includes the network automation engine 206 that determines how to dynamically change the management data managed by the managed node 208.

In one embodiment, the managed node 208 includes an agent 210, one or more services 212, and storage 214. In one embodiment, the agent 210 provides an interface to manage this managed node 208 and/or the one or more services 212. In one embodiment, the services 212 are a set of processes that provides one or more functionalities to other devices in the network that are communicatively coupled to the managed node 208 hosting the service, such as the service 116A-N as described in FIG. 1 above. In one embodiment, the storage 214 is used to store the management data.

In another embodiment, agent 210 runs on another device that is coupled to the managed node 208. In this embodiment, the agent 210 proxies the management commands 216 from the network management module 204 to the managed node 208. In one embodiment, the agent 210 receives the management commands 216 and translates the received management commands 216 into one or more native commands for the managed node 208. In addition, the agent 210 sends these one or more native commands to the managed node 208. Furthermore, and in this embodiment, the agent 210 receives the management data from 218 from the managed node 210 and forwards the management data 218 to the network management module 204.

In one embodiment, the management data 218 is periodically reported to the NMS 202. The type of management data 218 reported and with what frequency, as well as how the management data 218 is collected, is controlled by how the managed node 208 is configured. In one embodiment, this configuration of the management data 218 can be changed by the management commands 216 sent to the agent 210 from the network management module 204. In this embodiment, the agent 210 receives these commands 216 and applies the commands 216 to update the managed node configuration. In one embodiment, the management commands 216 can change the type of management information collected and/or reported, set the encryption and/or compression level of the management data collected and/or reported, the management data reporting frequency, a type of window (e.g., a window size based on data size and/or time interval) used to collect the management information, redirect the reporting of the management data to a different device (e.g., to a different NMS, report to multiple NMSs, send management data to a backup device, etc.), turn on/off a local status identifier on the managed node, saving data for forensic analysis, turn on/off logging, and/or a combination thereof. In one embodiment, the management commands are formatted using different network management protocols: Simple Network Management Protocol (SNMP), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), etc.

In one embodiment, the agent 210 detects the event and responds to the event without the NMS 202 intervening. In this embodiment, the agent 210 has access to a set of rules that the agent 210 uses to respond to a detected event and dynamically change the management of the management data 218 on the manage node 208.

In one embodiment, the managed node 208 reports the management data 218 to the NMS 202 by publishing the management data 218 on one or more publishing channels. In one embodiment, a publishing channel is a logical communications channel that copies the management data published to it to any subscribers of that channel. The publishing channel can be a device specific channel (e.g., publishing or listening for commands), or the publishing channel can correspond to a group of devices (e.g., a compliance channel, a managed node reporting management data to multiple NMS, etc.) In this embodiment, the NMS 202 subscribes to the publishing channels to receive the management data 218. In another embodiment, NMS 202 receives the management data 218 through other means (e.g., SNMP traps, syslog events, HTTP responses, telnet/SSH (command line interface), SOAP, etc.).

Figure 3:
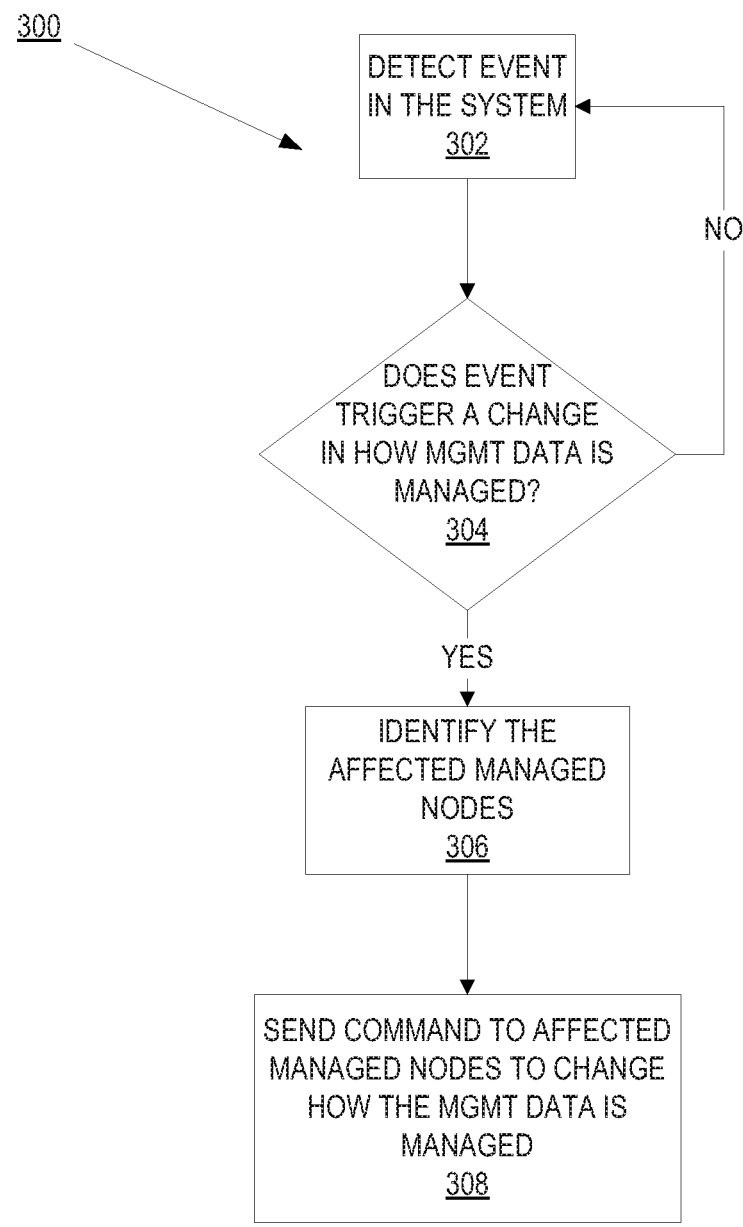
FIG. 3 is a flow diagram of a process to dynamically change how management data is managed in response to a detected event in the system in accordance with an embodiment of the present invention.

As described above, how management data is managed by each of the managed nodes in a network can be dynamically changed in response to an event in a system. FIG. 3 is a flow diagram of one embodiment of a process 300 to change how management data is managed in response to a detected event in the system. In one embodiment, process 300 is performed by the network automation engine to dynamically change the management of the management data, such as network automation engine 110 of FIG. 1, above. In another embodiment, process 300 is performed by an agent, such agent 210 of FIG. 2. In FIG. 3, process 300 detects an event in the system. In one embodiment, process 300 can detect an event by receiving an event notification from a managed node, detecting a system event in a network database, an agent detecting an event on a managed mode, detecting an event associated with a user interface, etc. For example and in one embodiment, a managed node can send an event notification indicating that a port status has changed, the NMS can detect an event in a network database that a performance of a business application is poor, where the business application is running on a virtual machine that is supported by a plurality of network elements, or the NMS can detect an event that indicates a system administrator has navigated to view a particular managed node or a particular component of that managed node. As another example, and in another embodiment, the agent detects an event on the managed node (e.g. congestion on a link, under/over utilization of a service on the managed node).

At block 304, process 300 determines if the detected event will trigger a change in how the management data of one of the managed nodes is managed. In one embodiment, process 300 determines if the detected event matches a rule for events that can trigger a management data change. In one embodiment, these rules can be a library of signatures, conditions, thresholds, state changes, etc. and/or a combination thereof. In this embodiment, the rules can indicate one or more conditions about managed node(s) or system regarding the environment, state, elements, traffic being processed, virus/malware detected, intrusion detection, etc., that may warrant a change in how the management data is being managed.

For example and in one embodiment, if a managed node notifies the NMS that there is congestion on a port of that managed node, process 300 would determine that such an event warrants that additional statistics and/or other management data regarding the congestion of that port (or other ports) should be collected by that managed node. As another example and in another embodiment, if the NMS detects that there is congestion on a first port of a first managed node and that first port is coupled to a second managed node via a second port, process 300 could determine that such an event warrants that additional statistics and/or other management data regarding the congestion of the second port should be collected by the second managed node. In a further example and a further embodiment, the NMS detects that a user interface has navigated to view a managed node. In this example, process 300 would determine that this user interface event would trigger a change of the type of and/or reporting frequency for the management data that is reported to the NMS. If the detected event does not trigger a change, execution proceeds to block 302.

If the detected event does trigger a change, at block 306, process 300 determines which managed nodes are affected by the detected event. In one embodiment, the number of managed nodes affected can be a single managed node, some of the managed nodes, or all of the managed nodes. In one embodiment, which managed node is affected can depend on the type of event detected. For example and in one embodiment, if the NMS receives an event notification from a managed node or the agent detects an event on that managed node, the managed node that sent the event notification or originated the event is the affected node. As another example and another embodiment, if the NMS detects that a service on a virtualized managed node is under-utilized, process 300 may determine that the affected managed nodes are the network elements that provide network access for this service and the clients that utilize the service. In this example, process 300 has knowledge of the network architecture of the network supporting the service on the virtualized node (e.g., network topology, location of services in the network, etc.) and process 300 takes advantage of this network architecture knowledge to determine which managed nodes of the network are affected by the detected event. In a further example and embodiment, the one or more managed nodes associated with a detected user interface event are the managed nodes affected by this user interface event. In this example, a system administrator may have navigated to a single managed node or a group of managed nodes through the NMS user interface, such user interface 104 of FIG. 1 above.

Process 300 sends a command to each of the affected managed nodes at block 308. In one embodiment, process 300 determines which command is appropriate for the change on that managed node. In this embodiment, the change associated with the detected event can be divided into specific changes for each of the affected managed nodes. In one embodiment, a command is a set of data that instructs how the configuration of a managed node should change. For example and in one embodiment, the command can change the type of management information collected and/or reported, set the encryption and/or compression level of the management data collected and/or reported, the management data reporting frequency, a type of window (e.g., a window size based on data size and/or time interval) used to collect the management information, redirect the reporting of the management data to a different device (e.g., to a different NMS, report to multiple NMSs, send management data to a backup device, etc.), turn on/off a local status identifier on the managed node, saving data for forensic analysis, turn on/off logging, and/or a combination thereof In one embodiment, where the detected event is an event notification from a managed node, process 300 creates a command for that managed node and sends the command to that managed node. For example and in one embodiment, if the event notification is a message from a managed node that indicates the port of a managed node has gone down, a corresponding command is to instruct the managed node to relay to the NMS a copy of previously captured data that was communicated through the affected port for a time period leading up this port going down. This captured data can be used for later analysis to help determine a reason for the port going down.

In another embodiment, where the detected event is a system event determined by the NMS, this event can affect multiple managed nodes. In this embodiment, process 300 creates a specific command for each of the affected managed nodes and sends that specific command to the corresponding affected managed node. For example and in one embodiment, if the NMS detects that a service on a virtualized managed node is under-utilized, the affected managed nodes can be the network access elements (e.g., switches, routers, etc.) that provide network access for this service and clients that utilize the service. In this example, the commands for these affected network elements could be commands that instruct the agent to turn on additional statistics, increase a reporting rate for some or all of the management data, increase a collection window for some or all of the management data, and/or a combination thereof. In a further embodiment, if the detected event is a user interface navigation event, where the event indicates that a system administrator is viewing a particular managed node or a particular part of the managed node, the command can be one that instructs the agent of that managed node to collect additional statistics, increase the reporting rate for the management data, increase a window collection and/or a combination thereof for that managed node or particular part of the managed node. For example and in one embodiment, if a system administrator navigates to view a switch in the network, initially the system administrator would view a small set of statistics (e.g., number of packets received, transmitted per time period). The NMS detects this navigation event and process 300 creates a command for the managed node being viewed to turn on additional statistics (e.g., number of packets dropped, characterization of packets being transmitted through the switch, precision timing information, etc.), turn on or increase a data collection window for some or all of the management data (e.g., turn on a collection communicated data headers, instruct the managed node to capture full packets over an increased time period, etc.), and/or increase the reporting frequency of some or all of the management data.

In a further example, process 300 detects that a path that is used to communicate management data to an NMS is down. In this embodiment, process 300 can increase the management data collection window for some or all of the management data so that this data can be saved for later reporting to the NMS when the path (or an alternate path) to the NMS becomes available. For example and in one embodiment, an agent associated with a managed node loses connectivity to the NMS. In response, the agent instructs the managed node to increase a collection window of some or all of the management data the managed node is collecting. Furthermore, in response to the agent detecting that connectivity to the NMS is available, the agent publishes the collected data to the NMS. In addition, the agent may reduce the collection windows to a size that was used prior to the detected NMS connectivity loss.

Figure 4:
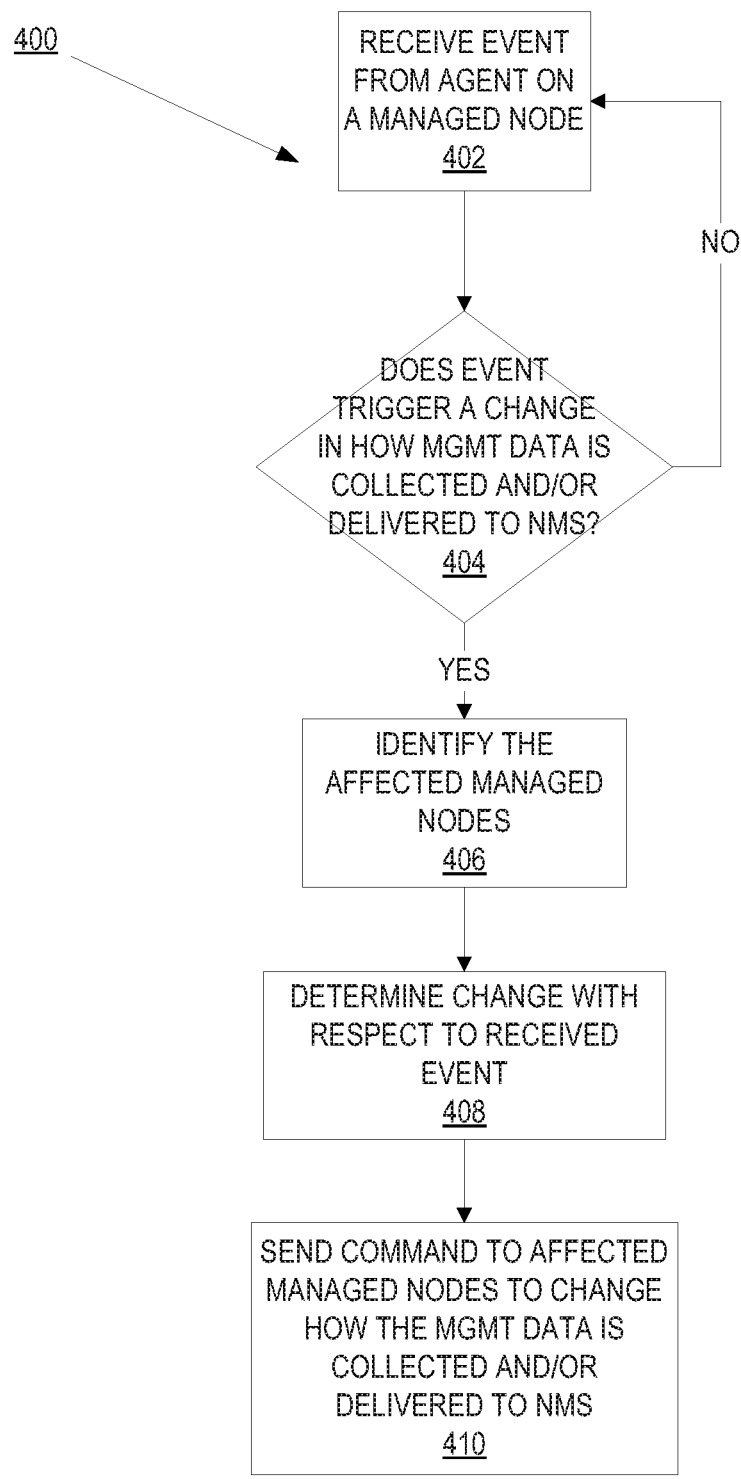
FIG. 4 is a flow diagram of a process to dynamically change how management data is managed in response to an event notification received from a managed node in accordance with an embodiment of the present invention.

As described above, events that can trigger a change in how management data is managed can be detected in a variety of ways (e.g., event notification from a managed node, agent detects the event, detected in a network database, a user interface event, etc.). FIG. 4 is a flow diagram of one embodiment of a process 400 to dynamically change how management data is managed in response to an event notification received from a managed node. In one embodiment, process 400 is performed by the network automation engine to dynamically change the management of the management data, such as network automation engine 110 of FIG. 1, above. In FIG. 4, process 400 begins by receiving an event notification from a managed node at block 402. In one embodiment, the agent of the managed node detects an event and sends a notification of that event to the NMS such as the NMS 106 of FIG. 1 above. For example and in one embodiment, process 400 can receive an event notification for a port status change of a managed node, fan failure, power failure, network link failure, link degradation, etc.

At block 404, process 400 determines if the event represented by the event notification triggers a change in how the management data on that managed node is managed. In one embodiment, process 400 determines whether the event triggers the management data change by determining if there is a rule that matches the event represented by the event notification. For example and in one embodiment, there can be a rule that indicates that a change in status of a port status (e.g., link up/down) of a managed node would trigger the management data change. As another example, and in another embodiment, percent utilization of a service on a managed node above a particular threshold would trigger a management data change for that managed node. Conversely and in this example, a percent utilization below that threshold would not trigger the management data change for that managed node.

If the event represented by the event notification does not trigger a management data change, execution proceeds to block 402. However, if the event represented by the event notification does trigger a management data change, at block 406, process 400 identifies the nodes that are affected by the potential management data change. In one embodiment, the managed node affected by the management data change is the managed node that sent the event notification to the NMS at block 402.

At block 408, process 400 determines the change for the affected managed node(s) with respect to the event indicated by the event notification. In one embodiment, process 400 determines the specific change from the rule that determined the event trigger change. For example and in one embodiment, if the received event notification indicates that a port status of a managed node has changed, the corresponding change for that managed node could be to increase/decrease the rate in which statistics are reported to the NMS. Alternately, additional data could be collected in the case of a port status changing to "down," such as saving previously captured data that was communicated through the affected port for a time period leading up this port going down. Furthermore, this management change may be one that cancels or changes a previous management change. In this example, if a port status changes from "down" to "up," the management data change that was implemented for the port status change to "down" is reversed.

As another example, and in another embodiment, a managed node notifies the NMS that a data processing throughput of that managed node has fallen below a certain threshold. In this example, the management data change for that managed node can be an increase of the reporting rate of some or all of the management data being collected and reported to the NMS. For example, the reporting rate for some or all of the management data can be increased such that this information is reported to the NMS more frequently. In one embodiment, the reporting rate is increased to be a real-time rate (e.g., the management data is reported as soon as this data becomes available) or a near real-time rate (e.g., the management data is reported with a frequency rate of a second or less). For example, if the managed node is a network element, these statistics can be packets received, packets transmitted, packets dropped, port throughput, fragments, QoS specific statistics, security events (rejected connections, intrusions detected, etc.) etc. In another embodiment, the types of statistics collected may be changed. In the same example, where the manage node is a network element reporting poor throughput, and this node is not reporting individual port dropped packets statistics, the management data change for this node could be turning on the reporting of individual port dropped packet statistics. In both of these examples, the management data communicated between the managed node and the NMS is dynamic and the rate and type of information communicated dynamically changes based on the conditions in the managed node.

At block 410, process 400 sends a command to each of the affected nodes for the corresponding management data change. In one embodiment, process 400 sends the command change to the agent of that managed node using a protocol that the agent communicates in. For example and in one embodiment, the commands can be SNMP, SOAP, HTTP, HTTPS, NETCONF, SSH, a command using a RESTful API, etc.

Figure 5:
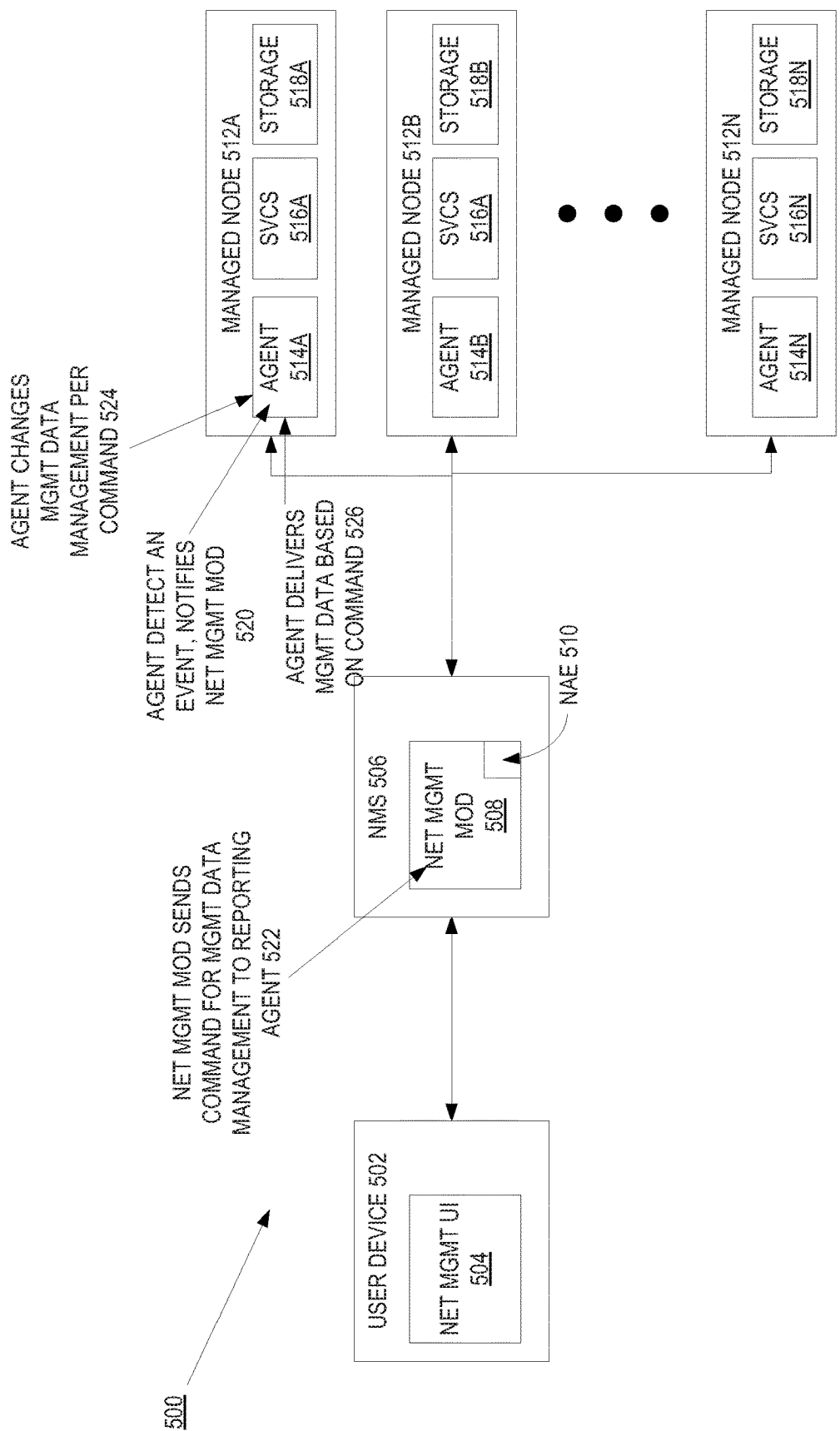
FIG. 5 is a block diagram of a system that dynamically changes how management data is managed on a managed node in response to a detected event received from the managed node in accordance with an embodiment of the present invention.

FIG. 5 is a block diagram of one embodiment of a system 500 that dynamically changes how management data is managed on a managed node 512A in response to a detected event received from the managed node 512A. In FIG. 5, the system 500 includes an NMS 506 that is used to monitor and administer the managed nodes 512A-N. In one embodiment, a system administrator interacts with the NMS 506 through a network management user interface 504 that is running on a device 502. As described above in FIG. 1, the NMS 506 includes a network management module 508 that is used to manage the managed nodes 512A-N. In addition, the network management module 508 includes the network automation engine 510, which dynamically changes how the management data is managed. In addition, each of the managed nodes 512A-N includes an agent 514A-N, one or more services 516A-N, and storage 518A-N. In one embodiment, the agent 514A-N is a module that runs on the managed node 514A-N and provides an interface to manage that managed node 514A-N. The services 516A-N running on the managed nodes 512A-N are a set of processes that provides one or more functionalities to other devices in the network that are communicatively coupled to the managed node hosting these services. In one embodiment, the storage 518A-N stores the management data.

In one embodiment, the agent 514A detects an event occurring on the managed node and sends a notification of this event to the network management module 508 of the NMS 506 (520). In this embodiment, the network management module 508 analyzes the event and determines if the event will trigger a change in how the management data is managed by the managed node 514A (522). If the event does trigger a change, the network management module 508 sends a corresponding command for the determined change to the agent 514A (522). In response to receiving the command, the agent changes the management data management per the received command (524). The agent delivers the management data based on the applied command (526). This embodiment illustrates the dynamic nature of the management data control between the NMS 506 and the agent 514A of the managed node 512A for an event detected by the managed node 512A.

Figure 6:
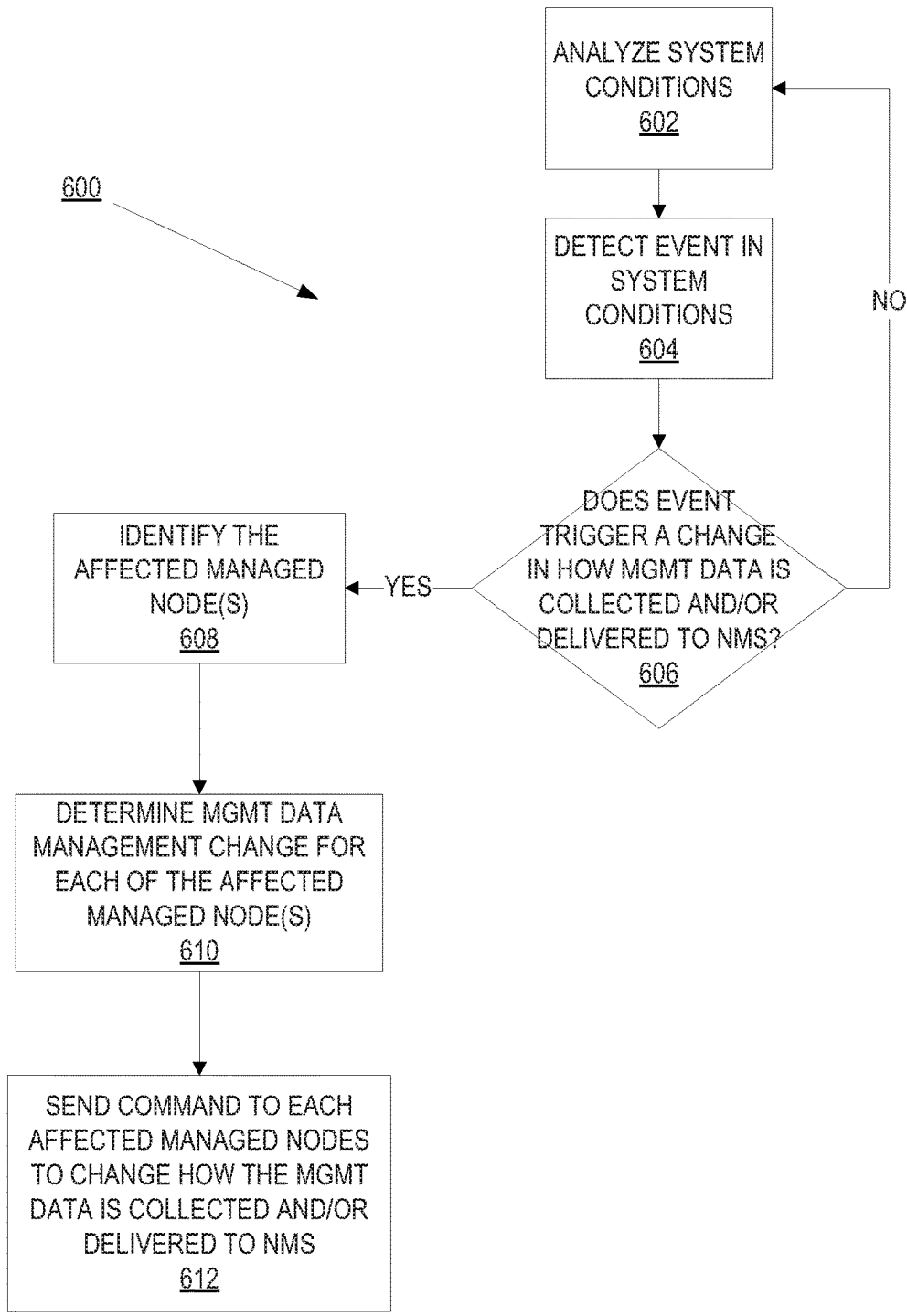
FIG. 6 is a flow diagram of a process to dynamically change how management data is managed in response to a detected system event in accordance with an embodiment of the present invention.

As described above, events detected in the system may also trigger a change to the management of management data in one or more managed nodes. FIG. 6 is a flow diagram of one embodiment of a process 600 to change how management data is managed in response to a detected system event. In one embodiment, process 600 is performed by the network automation engine to dynamically change the management of the management data, such as network automation engine 110 of FIG. 1, above. In FIG. 6, process 600 analyzes the system conditions for events in the system. In one embodiment, process 600 analyzes the system conditions for events by interrogating a network database. In one embodiment, the network database is a repository of management data received from some or all of the managed nodes in the network system. In another embodiment, process 600 monitors whether event notifications are received.

At block 604, process 600 detects an event in the system. In one embodiment, process 600 detects an event by interrogating a network database for conditions in the network that are recognized by process 600 as an event. In another embodiment, process 600 receives an event notification from a managed node. In this embodiment, the event notification represents an event that is detected by a managed node and is an event that could affect a managed node other than the one that detected the event. For example and in one embodiment, a managed node may detect congestion on an uplink and notify the NMS of this congested uplink. In this example, process 600 may want to change how the management data is managed on the managed node that is connected to the reporting managed node via that uplink. While in one embodiment, the events are detected by process 600 are events detected or received from managed nodes visible to process 600, in alternate embodiments the events are received from another source (e.g., fire alarm, event regarding environmental conditions, core network events, business events, etc.).

At block 606, process 600 determines if the detected event triggers a change in how the management data in one or more managed nodes in the system, such as the managed nodes 112A-N of system 100 above. In one embodiment, process 600 determines whether the event triggers the management data change by determining if there is a rule that matches the event represented by the detected event. For example and in one embodiment, there can be a rule that congestion on a link would trigger the management data change. As another example, and in another embodiment, percent utilization of a service above a particular threshold or a problem of that service on a managed node would trigger a management data change for that managed node. In a further example, and in a further embodiment, an event can be related to the amount of management traffic being communicated along one or more links in the system. In this example, the amount of management traffic may be restricted to a certain threshold or percentage of that link.

If the event represented by the event notification does not trigger a management data change, execution proceeds to block 602. However, if the event represented by the event notification does trigger a management data change, at block 608, process 600 identifies the managed nodes that are affected by the potential management data change. In one embodiment, the number of managed nodes affected can be one or more managed nodes. In one embodiment, process 600 uses the architecture of the system and the type of event to determine which of the managed nodes of the system are affected by the event. In one embodiment, process 600 uses the network topology of the interconnected managed nodes to determine which of the managed nodes are affected by the detected event. In the case of network device failure, process 600 walks the network topology to determine which child devices are affected, which parent devices may be the root cause, etc.

At block 610, process 600 determines the change for each of the managed nodes with respect to the detected event. In one embodiment, process 600 determines the specific change for each of the affected managed nodes from the rule that determined the detected event triggers a change. For example and in one embodiment, if the detected event is congestion on an uplink between two managed nodes and the event is detected using the management data of the downlinked managed node, the change would be turning on reporting of additional management data and/or increase the reporting rate of some or all of the management data for the uplinked managed node.

As another example, and in another embodiment, a system includes a trading application that runs on a virtual machine reports a problem. In addition, a server hosts the virtual machine and the network access for the server is handled by one or more network access elements. In this example, process 600 uses the knowledge of this network architecture to determine what the change in how the management data is managed. For example and in one embodiment, a change for the virtual machine could be to store packets being received and/or transmitted for later forensic analysis. As another example, the change for the server can be an increase a window in which some of the management data is collected. In addition, the one or more of network access elements may get a change to deflect or defend against a newly discovered security attack (e.g., an access control list (ACL) to block a new virus), to force the plurality of network elements to migrate, backup, recover, and/or move the management data to another datacenter (e.g., terminate from one datacenter and redirect the management data to another datacenter for disaster recovery purposes). In this example, in response to the detected event of a trading application reporting a problem, process 600 determines different specific changes in the how the management data is managed for the different managed nodes of this system.

In a further example, and in another embodiment, a system communicates management data in-band (e.g. transporting management data on the same links that is used to transport non-management data). In this example, if process 600 determines that the amount management exceeds a threshold on one or more links, process 600 determines that an overall reduction of the management traffic can be accomplished by a reduction of management traffic in the one or more managed nodes that are sending via the congested link(s). For example and in one embodiment, if management data is above a threshold on a link and three different network elements are forwarding management data over this link, process 600 could determine a specific change to reduce amount of management data for one, some, or all of the three network elements. The specific change for the affected network elements can be reporting a smaller number management data types, reporting management data with less frequency, and/or a combination thereof. In one embodiment, these specific changes can be the same (e.g., reducing the reporting frequency for the same management data) for the affected network elements. In another embodiment, the specific changes can be different for the different network elements (e.g., reducing reporting frequency by different amount for different network elements or management data, reducing reporting frequency for some network elements and turning off reporting of some or all management data on other network elements, no change, and/or a combination thereof). In one embodiment, the threshold can be percent bandwidth, a hard cap (e.g., 1 gigabit/second), etc. In this example, process 600 dynamically changes the management data utilization of a link by changing the type and/or rate of management data outputted by one or more managed nodes.

Figure 7:
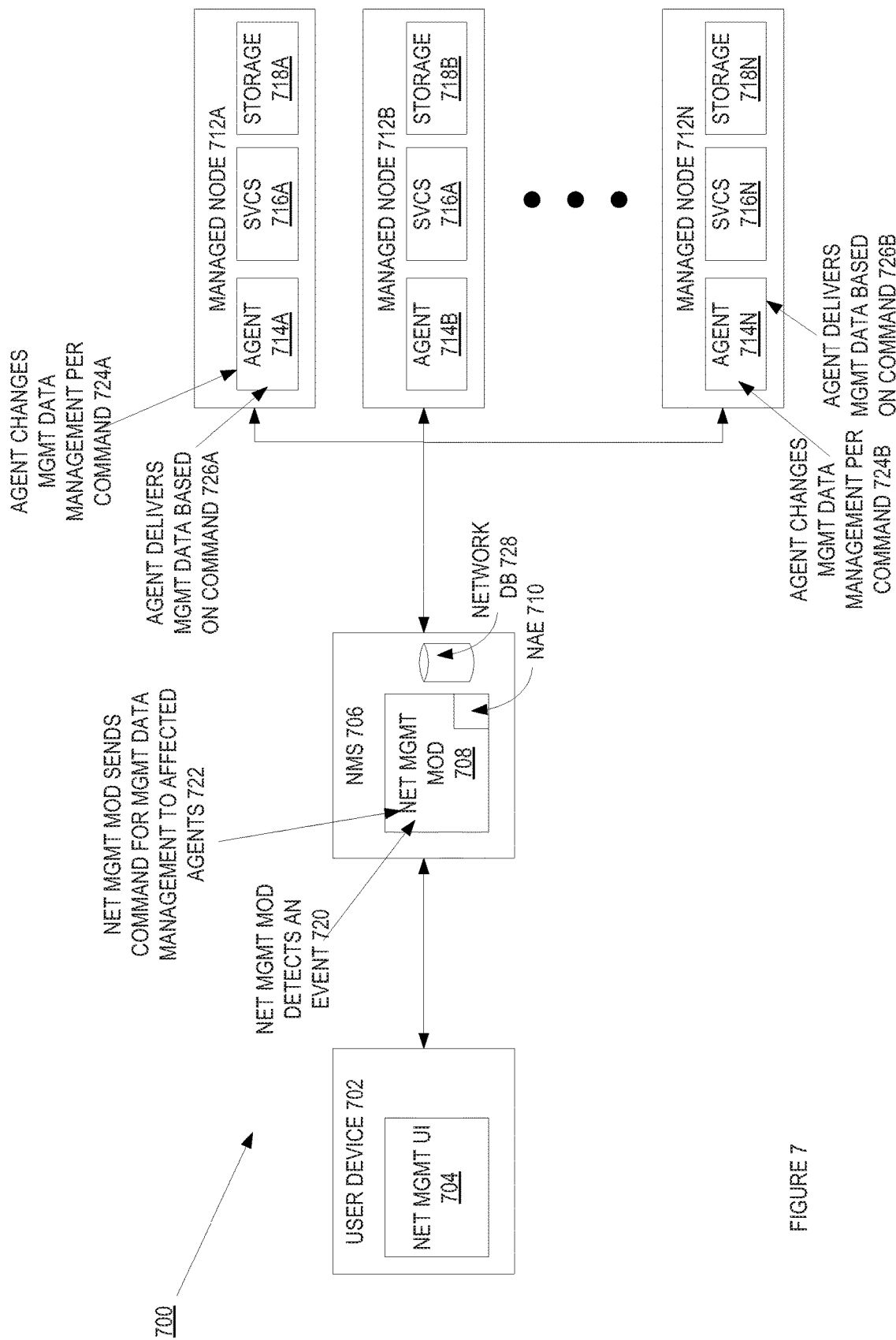
FIG. 7 is a block diagram of a system that dynamically changes how management data is managed in response to a detected system event in accordance with an embodiment of the present invention.

FIG. 7 is a block diagram of one embodiment of a system 700 that dynamically changes how management data is managed in response to a detected system event. In FIG. 7, the system 700 includes an NMS 706 that is used to monitor and administer the managed nodes 712A-N. In one embodiment, a system administrator interacts with the NMS 706 through a network management user interface 704 that is running on a device 702. In one embodiment, the NMS 706 includes a network management module 708 that is used to manage the managed nodes 712A-N and a network database 728 that stores the management data collected by the NMS 706. In addition, the network management module 708 includes the network automation engine 710, which dynamically changes how the management data is managed. In addition, each of the managed nodes 712A-N includes an agent 714A-N, one or more services 716A-N, and storage 718A-N. In one embodiment, the agent 714A-N is a module that runs on the managed node 714A-N and provides an interface to manage that managed node 714A-N. The services 716A-N running on the managed nodes 712A-N are a set of processes that provides one or more functionalities to other devices in the network that are communicatively coupled to the managed node hosting these services. In one embodiment, the storage 718A-N stores the management data.

In one embodiment, the network management module 708 detects an event (720). For example and in one embodiment, the network management module 708 detects the event by interrogating the network database 728. The network management module 708 determines the affected managed nodes and send the corresponding command(s) to each of the affected managed nodes (722). As illustrated in FIG. 7 and in one embodiment, the network management module 708 determines there are two affected managed nodes, managed nodes 712A and 712N. The agents 714A and 714N for each of these manages nodes 712A and 712N, receive the respective command(s) from the network management module 708. These agents 714A and 714N apply the respective command(s), which changes how the management data is managed on the corresponding managed nodes 712A and 712N (724A, 724B). The agents 714A and 714N deliver the management data based on the applied commands (726A and 726B). This embodiment illustrates the dynamic nature of the management data control between the NMS 706 and the multiple agents 714A and 714N of the managed nodes 712A and 712N, respectively.

Figure 8:
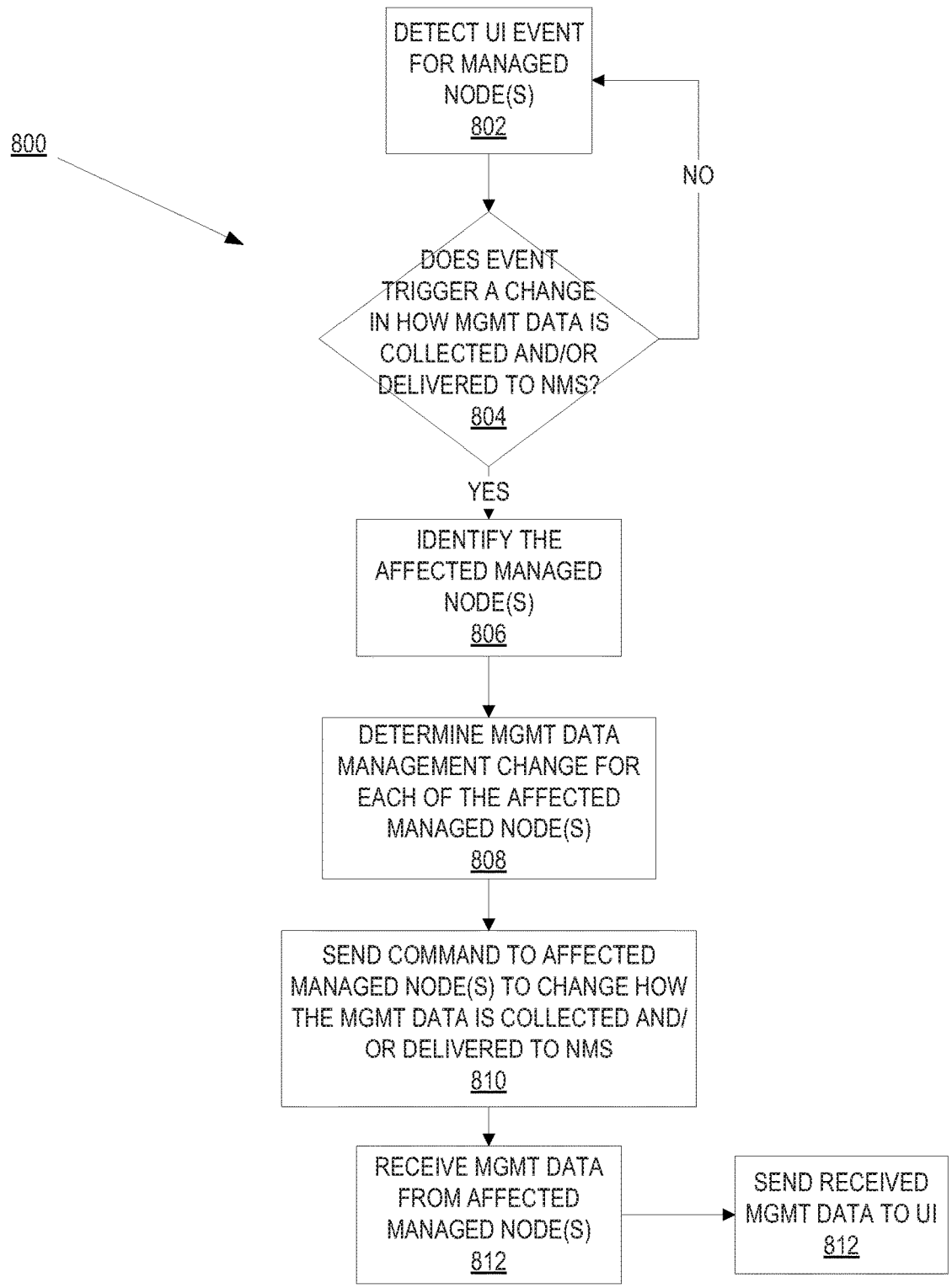
FIG. 8 is a flow diagram of a process to dynamically change how management data is managed in response to a detected user interface event in accordance with an embodiment of the present invention.

As described above, a detected event can be a user interface event. In one embodiment, a user interface event can occur if a user is navigating a network management user interface to view a managed node or a particular component of a managed node. FIG. 8 is a flow diagram of one embodiment of a process 800 to dynamically change how management data is managed in response to a detected user interface event. In one embodiment, process 800 is performed by the network automation engine to dynamically change the management of the management data, such as network automation engine 110 of FIG. 1, above. In FIG. 8, process 800 detects a user interface event for one or more managed nodes at block 802. In one embodiment, the user interface event is an indication that a user (e.g., a system administrator) has navigated to view a group of managed nodes, a single managed node, or a particular component of a managed node. For example and in one embodiment, a system administrator navigates to a view particular managed node, process 800 would detect a view managed node event. As another example, and in another embodiment, if the system administrator navigates to view a particular component of a managed node (e.g., a port of switch, a service of a virtual machine, etc.), process 800 would detect a corresponding view managed node component event.

At block 804, process 800 determines if the detected event triggers a change in how the management data is managed. In one embodiment, process 800 determines whether the detected user interface event triggers the management data change by determining if there is a rule that matches the event represented by the event notification. For example and in one embodiment, if process 800 determines that a user interface has navigated to view a particular managed node, this detected event would trigger a change for that managed node to report a greater detail of management data to the NMS. As another example and in another embodiment, if process 800 determines that a user interface has navigated to view a particular component of a managed node, this detected event would trigger a change for that managed node to report a greater detail of management data for that component. If the user interface event does not trigger a change, prosecution proceeds to block 802 above.

If the user interface event does trigger a change, at block 806, process 800 identifies which managed nodes are affected by the detected user interface event. In one embodiment, the affected managed node is the node that is navigated to and is indicated in the detected user interface event. In another embodiment, the affected node is a node that is navigated from and is indicated in the detected user interface event.

At block 808, process 800 determines the change for each of the affected managed nodes. In one embodiment, process 800 determines the specific change from the rule that determined the user interface event would trigger the change. For example and in one embodiment, consider that sequence of user interface navigations of a system administrator that views a group of managed nodes, such as switches A and B. In this example, the system administrator initially navigates to view both switches (view 1), followed by viewing switch A (view 2), then viewing a port of switch A (view 3), and, finally, viewing switch B (view 4). In view 1, the change would be for switch A and B to report general management data to the NMS, which presents this information to the system administrator via the user interface. For example and in one embodiment, each switch would be instructed to report a general overall status of that switch (e.g., the switching is up and functioning normally). Changing to view 2, the change is for managed node A to report additional management data. For example and in one embodiment, switch A is instructed to report additional statistics of switch A (e.g., total packets received, transmitted, and/or dropped). Alternatively, the change can be to report these additional statistics with an increased frequency. For example and in one embodiment, switch A reports the total packets received, transmitted, and dropped every minute and the change is to report the statistics in real-time (e.g., as soon as the statistics are collected) or near real-time (e.g., every second or less). By switching to view 3, which is a view of one of the ports of switch A, the change is to report statistics for that particular port (e.g., if port 1 of switch A is viewed, the change is to turn on reporting of statistics for that port, such packets received, transmitted, dropped, etc., for port 1). Alternatively, the port-based statistics can be reported with increased frequency (e.g., reporting these statistics in real-time or near-real-time). In view 4, the system administrator has switched from a detailed view of switch A to a general view of switch B. In one embodiment, the change is for both switch A and B, as switch A is to turn off reporting of the detailed system and port statistics to the NMS and switch B is to turn on the reporting of the general switch statistics to the NMS. Alternatively, the reporting frequency for the switch A statistics is reduced and the reporting frequency for the switch B statistics is increased. In another embodiment, additional statistics reporting can be turned on/off in combination with increased/decreased statistics reporting. This illustrates the dynamic nature of the management of the management data for this system. As the system administrator switches views of the network through the user interface, the type and frequency of management data reported to the NMS changes.

At block 810, process 800 sends the corresponding command to each of the affected managed nodes. In one embodiment, process 800 determines the specific change from the rule that determined the detected event triggers the change. For example and in one embodiment, the corresponding command could be to turn on/off the reporting of certain management data (e.g., turn on/off reporting of port statistics in response to navigating to/from a view of port statistics) and/or increase/decrease management data reporting frequency (e.g., increase/decrease reporting frequency for port statistics in response to navigating to/from a view of port statistics).

Process 800 receives the management data from the affected management nodes at block 812. In one embodiment, process 800 receives additional management data and/or management data at an increased frequency. Process 800 sends the received management data to the user interface at block 812.

Figure 9:
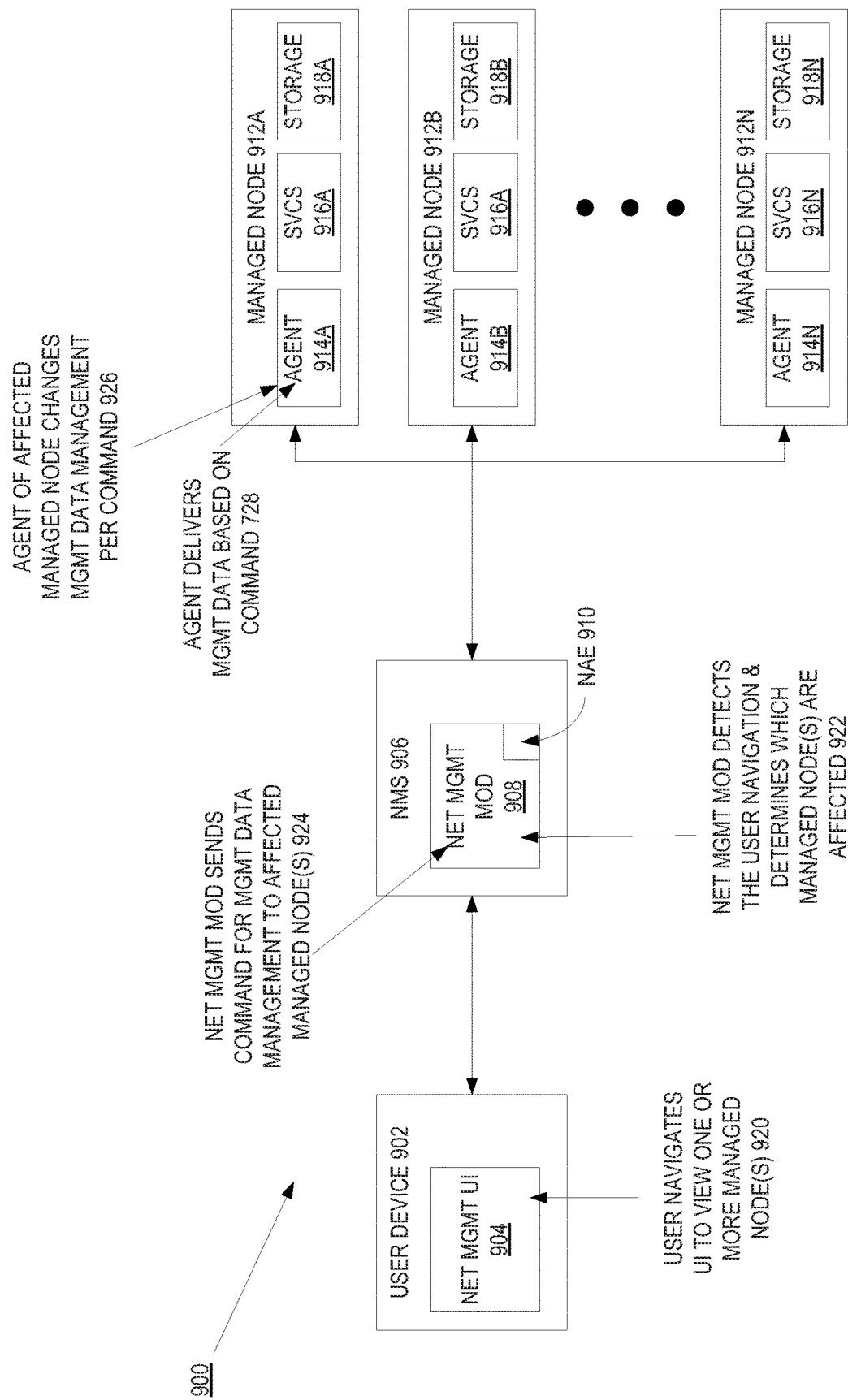
FIG. 9 is a block diagram of a system that dynamically changes how management data is managed in response to a detected user interface event in accordance with an embodiment of the present invention.

FIG. 9 is a block diagram of one embodiment of a system 900 that dynamically changes how management data is managed in response to a detected user interface event. In FIG. 9, the system 900 includes an NMS 906 that is used to monitor and administer the managed nodes 912A-N. In one embodiment, a system administrator interacts with the NMS 906 through a network management user interface 904 that is running on a device 902. As described above in FIG. 1, the NMS 906 includes a network management module 908 that is used to manage the managed nodes 912A-N. In addition, the network management module 908 includes the network automation engine 910, which dynamically changes how the management data is managed. In addition, each of the managed nodes 912A-N includes an agent 914A-N, one or more services 916A-N, and storage 918A-N. In one embodiment, the agent 914A-N is a module that runs on the managed node 914A-N and provides an interface to manage that managed node 914A-N. The services 916A-N running on the managed nodes 912A-N are a set of processes that provides one or more functionalities to other devices in the network that are communicatively coupled to the managed node hosting these services. In one embodiment, the storage 918A-N stores the management data.

In one embodiment, a user navigates a user interface to view one or more managed node(s) (920). For example and in one embodiment, the user could navigate to view the managed node 912A or a particular component of the manage node 912A. The network management module 908 detects this user navigation and determines which of the managed node(s) are affected (922). For example and in one embodiment, the affected managed node is managed node 912A. The network management module sends a command for the managed data management change to the affected node 912A (924). The agent 914A receives the management data management command and applies this command to apply the management data management change (926). The agent 914A delivers the management data based on the applied commands (928). This embodiment illustrates the dynamic nature of the management data control between the NMS 906 and an agent 914A based on the actions of a user navigating a user interface.

Figure 10:
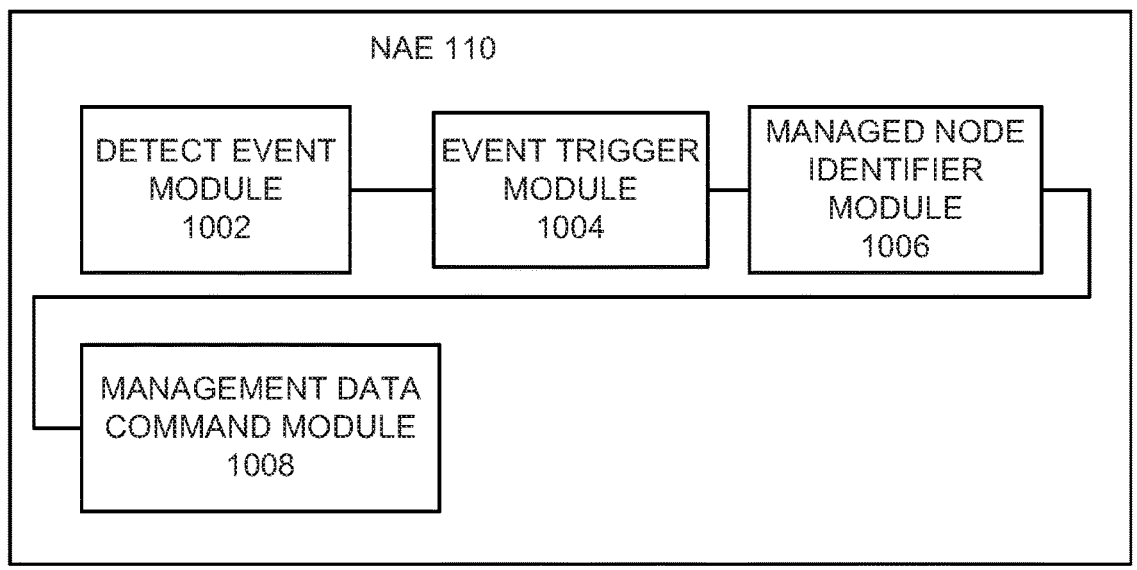
FIG. 10 is a block diagram of a network automation engine that manages how management data is collected for and/or communicated with a network management system in accordance with an embodiment of the present invention.

FIG. 10 is a block diagram of one embodiment of a network automation engine 110 that manages how management data is collected for and/or communicated with a network management system. In one embodiment, the network automation engine 110 includes detect event module 1002, event trigger module 1004, managed node identifier 1006, and management data command module 1008. The detect event module 1002 detects an event as described in FIG. 3, block 302 above. The event trigger module 1004 determines if the detected event as described in FIG. 3, block 304 above. The managed node identifier 1006 identifies the affected managed nodes as described in FIG. 3, block 306 above. The management data command module 1008 sends the management change command as described in FIG. 3, block 308 above.

Figure 11:
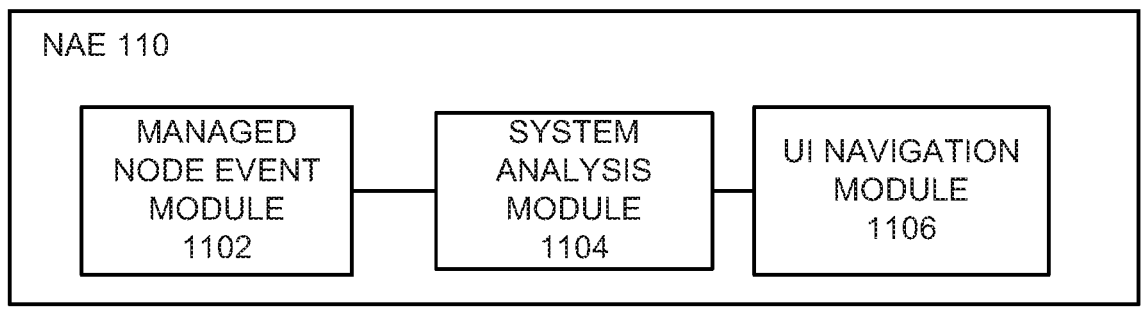
FIG. 11 is another block diagram of a network automation engine that manages how management data is collected for and/or communicated with a network management system in accordance with an embodiment of the present invention.

FIG. 11 is another block diagram of another embodiment of a network automation engine 110 that manages how management data is collected for and/or communicated with a network management system. In one embodiment, the network automation module 110 includes managed node event module 1102, system analysis module 1104, and user interface navigation module 1106. In this embodiment, the managed node event module 1102 dynamically changes the management data management based on an event notification from a managed node as described in FIG. 4 above. The system analysis module 1104 dynamically changes the management data management based on detected system event as described in FIG. 6 above. The user interface navigation module 1106 dynamically changes the management data management based on a user interface navigation event as described in FIG. 8 above.

Figure 12:
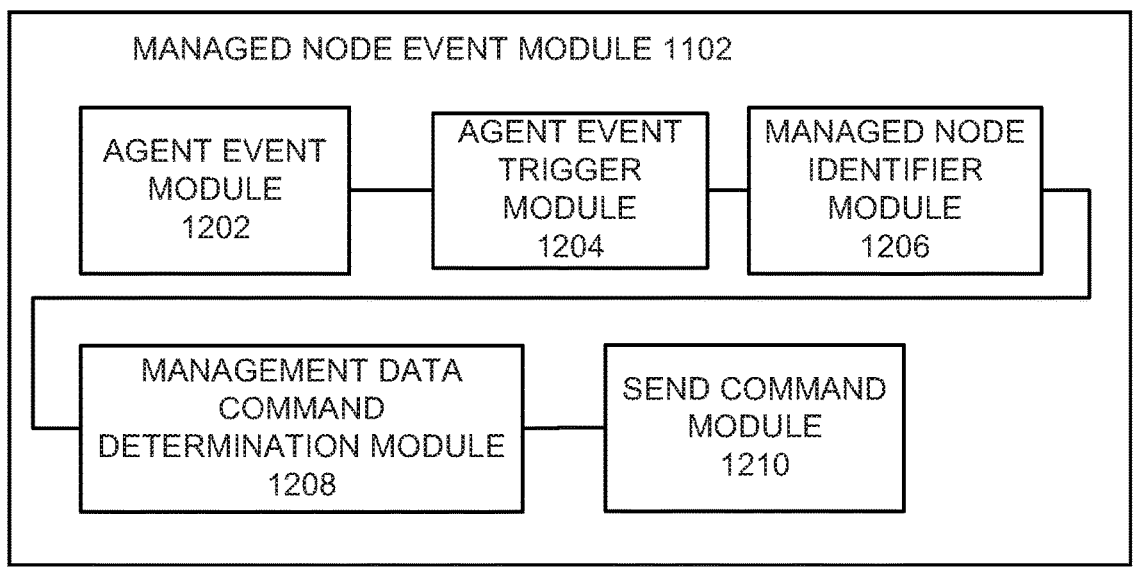
FIG. 12 is a block diagram of managed node event module that dynamically changes how management data is managed in response to a detected event received from a managed node in accordance with an embodiment of the present invention.

FIG. 12 is a block diagram of managed node event module 1102 that dynamically changes how management data is managed in response to a detected event received from a managed node. In one embodiment, the managed event module 1102 includes agent event module 1202, agent event trigger module 1204, managed node identifier 1206, management data command determine module 1208, and send command module 1210. In this embodiment, the agent event module 1202 receives an event notification from an agent as described above in FIG. 4, block 402. In one embodiment, the agent event module 1202 includes memory that is used to store the event notification. The agent event trigger module 1204 determines if the event triggers a change as described above in FIG. 4, block 404. The managed node identifier 1206 identifies the affected managed nodes as described above in FIG. 4, block 406. The management data command determine module 1208 determines the command for each of the affected managed nodes as described above in FIG. 4, block 408. The send command module 1210 sends the command to each of the affected managed nodes as described above in FIG. 4, block 410.

Figure 13:
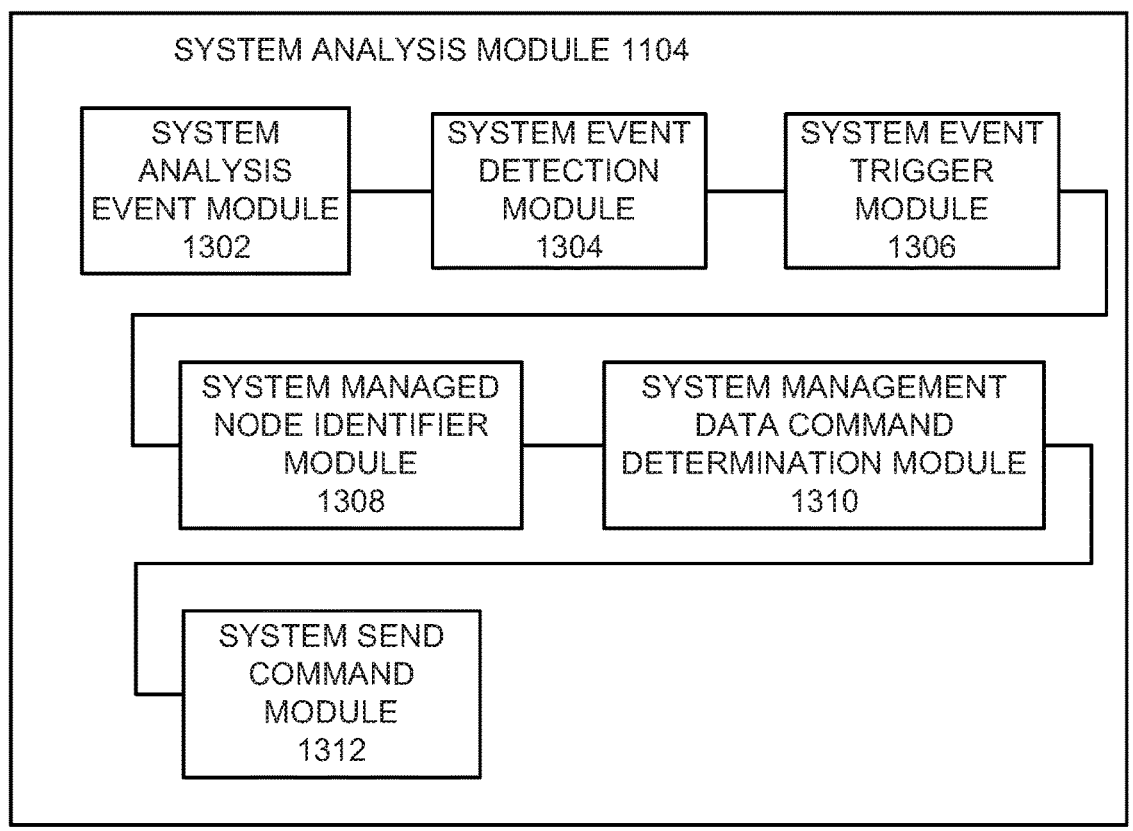
FIG. 13 is a block diagram of a system analysis module that dynamically changes how management data is managed in response to a detected system event in accordance with an embodiment of the present invention.

FIG. 13 is a block diagram of a system analysis module 1104 that dynamically changes how management data is managed in response to a detected system event. In one embodiment, the system analysis module 1104 include system analysis event module 1302, system event detection module 1304, system event trigger module 1306, system managed node identifier module 1308, system management data command determination module 1310, and system send command module 1312. In one embodiment, the system analysis event module 1302 analyzes the system conditions for events as described above in FIG. 6, block 602 above. The system event detection module 1304 detects the system event as described above in FIG. 6, block 604 above. In one embodiment, the system event detection module 1304 includes memory that is used to store the detected event. The system event trigger module 1306 determines if the detected system event triggers a change as described above in FIG. 6, block 606 above. The system managed node identifier module 1308 identifies the affected managed nodes as described above in FIG. 6, block 608 above. The system management data command determination module 1310 determines the management data command for each of the affected managed nodes as described above in FIG. 6, block 610 above. The system send command module 1312 sends the commands as described above in FIG. 6, block 612 above.

Figure 14:
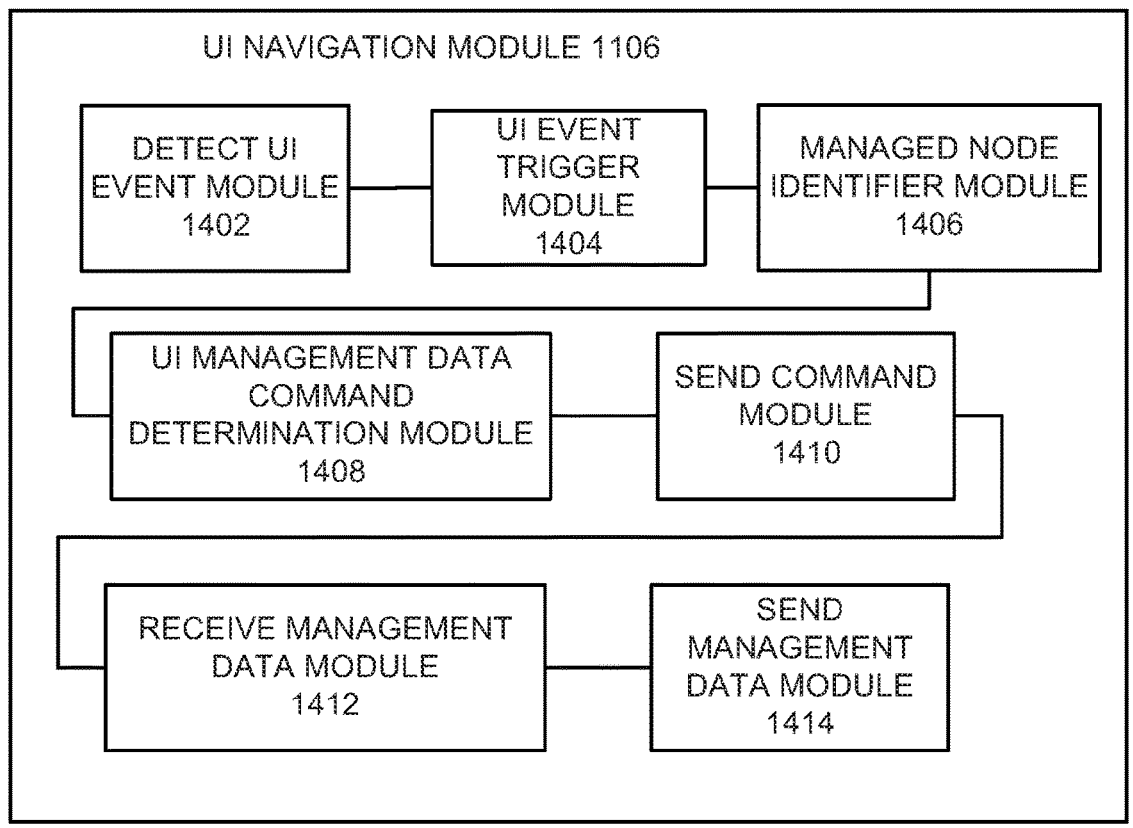
FIG. 14 is a block diagram of a user interface navigation module that dynamically changes how management data is managed in response to a detected user interface event in accordance with an embodiment of the present invention.

FIG. 14 is a block diagram of a user interface navigation module 1106 that dynamically changes how management data is managed in response to a detected user interface event. In one embodiment, the user interface navigation module 1106 includes detect user interface module 1402, user interface event trigger module 1404, managed node identifier module 1406, user interface management data command determination module 1408, send command module 1410, receive management data module 1412, and send management data module 1414. In one embodiment, the detect user interface module 1402 detects a user interface event as described in FIG. 8, block 802 above. In one embodiment, the detect user interface module 1402 includes memory that is used to store the detected event. The user interface event trigger module 1404 determines if the detected user interface event triggers a change as described in FIG. 8, block 804 above. The managed node identifier module 1406 identifies the affected managed nodes as described in FIG. 8, block 806 above. The user interface management data command determination module 1408 determines the management data change command as described in FIG. 8, block 808 above. The send command module 1410 sends the command as described in FIG. 8, block 810 above. The receive management data module 1412 receives the updated management data as described in FIG. 8, block 812 above. The send management data module 1414 send the updated management data to the user interface as described in FIG. 8, block 814 above.

Figure 15:
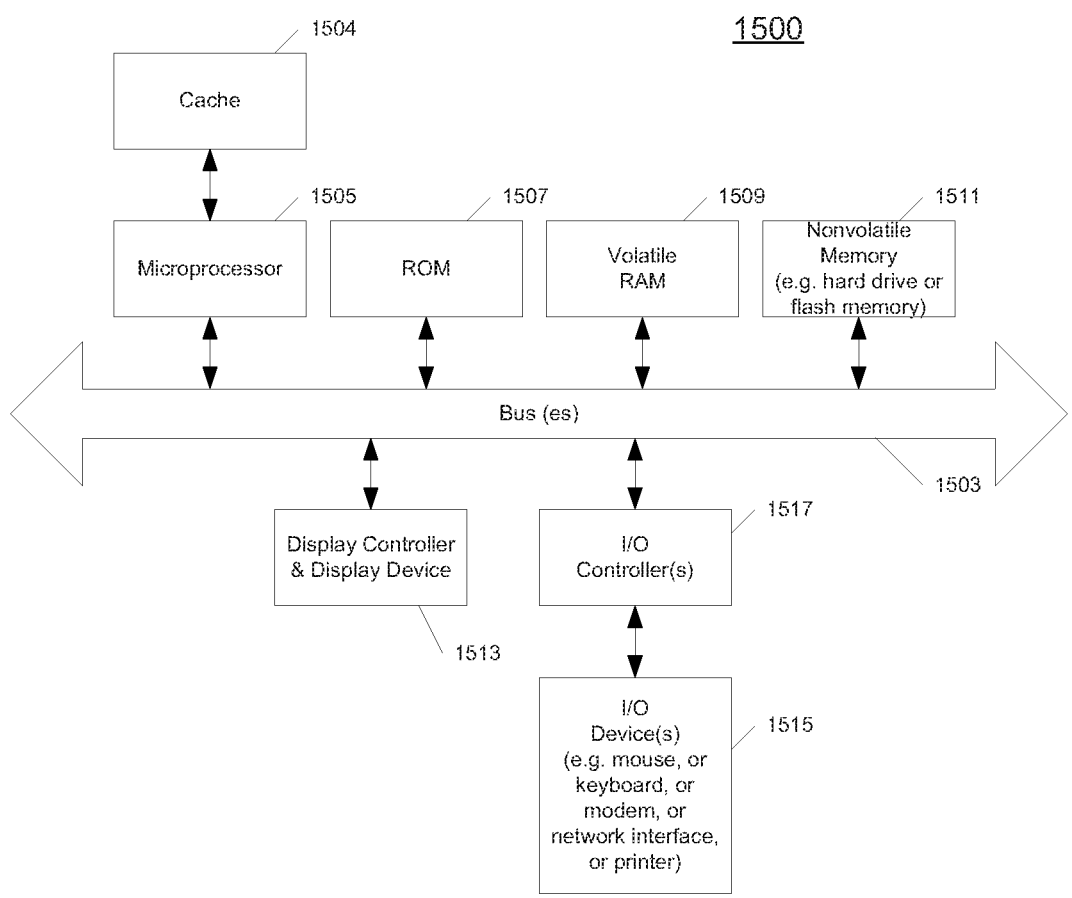
FIG. 15 illustrates one example of a typical computer system, which may be used in conjunction with the embodiments described herein.

FIG. 15 shows one example of a data processing system 1500, which may be used with one embodiment of the present invention. For example, the system 1500 may be implemented including an NMS 106 as shown in FIG. 1. Note that while FIG. 15 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 15, the computer system 1500, which is a form of a data processing system, includes a bus 1503 which is coupled to a microprocessor(s) 1505 and a ROM (Read Only Memory) 1507 and volatile RAM 1509 and a non-volatile memory 1511. The microprocessor 1505 may retrieve the instructions from the memories 1507, 1509, 1511 and execute the instructions to perform operations described above. The bus 1503 interconnects these various components together and also interconnects these components 1505, 1507, 1509, and 1511 to a display controller and display device 1515 and to peripheral devices such as input/output (I/O) devices which may be mice, keyboards, modems, network interfaces, printers and other devices which are well known in the art. Typically, the input/output devices 1515 are coupled to the system through input/output controllers 1517. The volatile RAM (Random Access Memory) 1509 is typically implemented as dynamic RAM (DRAM), which requires power continually in order to refresh or maintain the data in the memory.

The mass storage 1511 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1511 will also be a random access memory although this is not required. While FIG. 15 shows that the mass storage 1511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "transmitting," "sending," "forwarding," "detecting," "reporting," "collecting," "communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
detecting, by a network management system (NMS) associated with a private network and communicatively coupled to a plurality of nodes managed by the NMS, an occurrence of an event associated with a network management user interface of a user device through which a system administrator interacts with the NMS, wherein the event is indicative of navigation by the system administrator within the network management user interface to view a particular managed node of the plurality of nodes managed by the NMS or a particular component of the particular managed node;
determining, by the NMS, the event triggers a change in how management data is one or more of (i) collected by the particular managed node and (ii) reported by the particular managed node, wherein the management data includes information that characterizes a functioning state of the particular managed node or the particular component or information regarding network traffic being processed by the particular managed node or the particular component;
determining, by the NMS, a command based on a rule matching the event from a set of rules for the particular managed node that represents a directive to the particular managed node to implement a specific change in how the management data is collected by the particular managed node or reported by the particular managed node to the NMS; and
causing an agent resident on the particular managed node to implement the specific change by sending, by the NMS, the command to the agent resident on the particular managed node.

2. The method of claim 1, wherein the specific change comprises an increase in a reporting frequency of the management data to the NMS.

3. The method of claim 1, wherein the specific change comprises a change in a type of management data that is collected and reported to the NMS.

4. The method of claim 1, wherein the specific change comprises a change selected from one or more of a rate of collection of the management data by the agent, a window size of collected management data, and a rate of logging of the management data.

5. The method of claim 1, wherein the particular managed node comprises one or more of a network access element or a network security device in virtual or physical form.

6. The method of claim 1, wherein the particular managed node comprises a switch and the management data comprises a number of packets received or transmitted by the switch during a particular time period.

7. The method of claim 6, wherein the management data further comprises a number of packets dropped by the switch during the particular time period and characterization of packets traversing the switch.

8. The method of claim 1, wherein the particular component comprises a port of the particular managed node.

9. The method of claim 8, wherein the specific change comprises a change selected from one or more of a first level of detail of management data including a first set of statistics and a second level of detail of management data including a second set of statistics to be reported to the NMS, wherein the second set of statistics includes the first set of statistics and one or more additional statistics.

10. The method of claim 1, wherein the particular component comprises a service of the particular managed node.

11. A non-transitory machine-readable medium having embodied thereon executable instructions to cause one or more processors of a network management system (NMS) associated with a private network and communicatively coupled to a plurality of nodes managed by the NMS to perform a method comprising:
detecting an occurrence of an event associated with a network management user interface of a user device through which a system administrator interacts with the NMS, wherein the event is indicative of navigation by the system administrator within the network management user interface to view a particular managed node of the plurality of nodes managed by the NMS or a particular component of the particular managed node;
determining the event triggers a change in how management data is one or more of (i) collected by the particular managed node and (ii) reported by the particular managed node, wherein the management data includes information that characterizes a functioning state of the particular managed node or the particular component or information regarding network traffic being processed by the particular managed node or the particular component;
determining a command based on a rule matching the event from a set of rules for the particular managed node that represents a directive to the particular managed node to implement a specific change in how the management data is collected by the particular managed node or reported by the particular managed node to the NMS; and
causing an agent resident on the particular managed node to implement the specific change by sending the command to the agent resident on the particular managed node.

12. The non-transitory machine-readable medium of claim 11, wherein the specific change comprises an increase in a reporting frequency of the management data to the NMS.

13. The non-transitory machine-readable medium of claim 11, wherein the specific change comprises a change in a type of management data that is collected and reported to the NMS.

14. The non-transitory machine-readable medium of claim 11, wherein the specific change comprises a change selected from one or more of a rate of collection of the management data by the agent, a window size of collected management data, and a rate of logging of the management data.

15. The non-transitory machine-readable medium of claim 11, wherein the particular managed node comprises one or more of a network access element or a network security device in virtual or physical form.

16. The non-transitory machine-readable medium of claim 11, wherein the particular managed node comprises a switch and the management data comprises a number of packets received or transmitted by the switch during a particular time period.

17. The non-transitory machine-readable medium of claim 16, wherein the management further data comprises a number of packets dropped by the switch during the particular time period and characterization of packets traversing the switch.

18. The non-transitory machine-readable medium of claim 11, wherein the particular component comprises a port of the particular managed node.

19. The non-transitory machine-readable medium of claim 18, wherein the specific change comprises a change selected from one or more of a first level of detail of management data including a first set of statistics and a second level of detail of management data including a second set of statistics to be reported to the NMS, wherein the second set of statistics includes the first set of statistics and one or more additional statistics.

20. The non-transitory machine-readable medium of claim 11, wherein the particular component comprises a service of the particular managed node.

\* \* \* \* \*